| United States Patent [19] | [11] Patent Number: 4,810,318 |
| Haisma et al. | [45] Date of Patent: Mar. 7, 1989 |

[54] METHOD OF BONDING TWO PARTS TOGETHER

[75] Inventors: Jan Haisma; Cornelis L. Adema; Cornelis L. Alting; Rudolf Brehm, all of Eindhoven, Netherlands

[73] Assignee: U.S. Philips Corporation, New York, N.Y.

[21] Appl. No.: 11,416

[22] Filed: Feb. 3, 1987

Related U.S. Application Data

[63] Continuation of Ser. No. 837,314, Mar. 3, 1986, abandoned, which is a continuation of Ser. No. 645,883, Aug. 30, 1984, abandoned.

[30] Foreign Application Priority Data

Sep. 8, 1983 [NL] Netherlands ............... 8303109

[51] Int. Cl.$^4$ ........................................... B32B 31/00
[52] U.S. Cl. ........................................ 156/153; 29/458; 51/317; 156/1; 156/60; 156/101; 156/182; 156/281; 156/306.3; 156/325

[58] Field of Search ............... 156/306.3, 60, 182, 156/101, 281, 153, 325; 29/458; 51/317

[56] References Cited

U.S. PATENT DOCUMENTS

| 2,169,194 | 8/1939 | Geyer et al. | 29/458 |
| 2,617,746 | 3/1954 | Brew | 156/325 |
| 2,709,147 | 5/1955 | Ziegler | 156/153 |
| 3,108,370 | 10/1963 | Peickii et al. | 29/458 |
| 4,389,819 | 6/1983 | Williamson et al. | 51/317 |

*Primary Examiner*—John J. Gallagher
*Attorney, Agent, or Firm*—Norman N. Spain

[57] ABSTRACT

By means of a method of bonding a first part and a second part together, in which at least one thin layer is provided on at least one of the parts and is activated by a slight polishing treatment, after which the likewise activated surface of the second part is bonded to the activated surface of the first part by mechanical wringing, a rigid bond can be obtained in which the spacing between the parts can be accurately adjusted.

13 Claims, 1 Drawing Sheet

METHOD OF BONDING TWO PARTS TOGETHER

This application is a continuation of application Ser. No. 837,314, filed Mar. 3, 1986 and now abandoned, which application Ser. No. 837,314 is a continuation of application Ser. No. 645,883, filed Aug. 30, 1984 and now abandoned.

The invention relates to a method of bonding a first part and a second part together, at least one layer of a solid being provided between said parts.

Such a method is known from German patent application No. 29 23 011 laid open to public inspection in which a method is described for bonding two quartz elements together. An aluminum layer which is from 0.001 mm to 0.2 mm thick is provided between the quartz elements, after which the quartz elements are heated to the melting temperature of aluminum (600° to 640° C.) and are compressed in a vacuum under a pressure from 5 to $15N/mm^2$. However, it is often not desired to heat the parts to such a high temperature, for example, because reflecting layers also are still present on the parts and cannot withstand such high temperatures. The spacing between the parts cannot be adjusted accurately either.

It is known from U.S. Pat. No. 3,387,226 to bond two parts together in a vacuum-tight manner by means of wringing in contact. In this case a mirror support of a laser is bonded to a quartz block provided with a narrow channel which contains a gaseous laser medium. The disadvantage of this way of bonding parts together is that the spacing between the parts cannot be adjusted.

It is therefore an object of the invention to provide a method of bonding two parts together in which no high temperature and high pressure are necessary and in which the spacing between the parts can be accurately adjusted.

For that purpose, a method of the type described in the opening paragraph is characterized according to the invention in that at least one layer is provided on at least one of the parts and is activated by a polishing treatment which negligibly reduces the thickness of the layer, after which a similarly activated surface on the second part is bonded to the activated surface of the first part by placing the two parts one against each other without any additional treatment and wringing in contact.

By providing one or more layers on at least one of the parts to be bonded together, for example by vapour deposition, and then, after activating the contact surfaces by the polishing treatment, wringing in contact said layers, the spacing between the parts can be accurately adjusted.

At least one layer may be provided between the parts which has a refractive index which differs from the refractive index of the materials of the parts. The layer may be an amorphous layer, for example, an $SiO_2$ layer, or a polycrystalline layer, for example, a layer of $TiO_2$, $MgF_2$, $Al_2O_3$, $GaO_3$, $HfO_2$ or $ZnS$. It may be an epitaxial monocrystalline layer, for example, Si on GaP, as described in Appl. Phys. Lett 42 (12) June 15, 1983, pp 1037 et seq, or $(PbLa)(ZrTi)O_3$ on sapphire, as described in Appl. Phys. Lett. 42 (10) May 15, 1983, pp 867 et seq.

Wringing in contact can be carried out, for example, on a number of dichroic layers. It has proved possible, for example, to wring a quartz part on a stack of 43 layers consisting alternately of $SiO_2$ (n=1.47) and $TiO_2$ (n=2.5) which is provided on another quartz part, said stack having a thickness of 3.22 $\mu m$.

It is also possible, however, to wring in contact on an indium-tin oxide layer or to incorporate said layer in the stack of dichroic layers on which is wrung. Because such an indium-tin oxide layer is electrically conductive, it may be used, for example, as a leadthrough in an electric discharge tube in which parts of the tube are bonded together in the manner according to the invention with the interposition of an indium-tin oxide layer. The parts may be, for example, the window and the cylinder wall of the envelope of a television camera tube.

It is possible to provide at least one magneto-optical layer between the parts or in the layer stack. For example, such layers are 2 $\mu m$ thick layers of yttrium iron garnet (YIG) as described in Physica Status Solidi A 13 493-498 (1972) "Sputtering at YIG thin films from a powder mixture of iron oxide and yttrium oxide"; by B. W. Delf, A. Green and R. J. Stevens.

Another possibility is to provide at least one electro-optical layer between the parts or in the layer stack. It may be incorporated between two indium-tin oxide layers which serve as electrodes for the electro-optical layer. Such an electro-optical layer may be incorporated in a lens or a system of lenses, as will be explained hereinafter. Such electro-optical layers consist, for example, of a sputtered thin layer of $BaTiO_3$ as described in Ferroelectrics 1978, Vol 22 pp 775-777, and J. Vac. Sci. Technol., 16(2) Mar/Apr. 1979, p. 315 et seq, or of a sputtered epitaxial thin layer of (Pb,La) (Zr,Ti)$O_3$ as described in Appl. Phys. Lett. 42 (10) May 15, 1983, p 867 et seq.

In all cases wringing in contact is possible only if the surfaces which are to be bonded together are activated by a slight polishing treatment. This is a polishing treatment which negligibly reduces the layer thickness or surface to be bonded so as to make a "Fresh" surface. This slight polishing treatment is preferably carried out with cerium oxide powder and for less than a minute.

It will be obvious that this bonding technique may also be used in parts which are fully covered with a layer. However, it is also possible to wring onto a layer or layer stack provided in the form of a pattern, (for example a ring) on a part. If a small recess is made in such an annular pattern which also forms a seal, it is possible to make a readily defined gas outlet, for example, for helium. It is also possible to vapour deposit, for example a, 2 $\mu m$ thick $SiO_2$ layer on a stack of dichroic layers. Instead of $SiO_2$, a vapour deposition glass, for example a, Schott 8329 (n=1.52) may also be used. (Schott 8329 is a trademark of Schott Glassworks). The layer stack on which a part is wrung in contact may form a part of a multilayer mirror, for example, as used in optical filters and reflectors for gas discharge lasers.

The invention will now be described in greater detail, by way of example, with reference to a drawing, in which FIGS. 1a and b demonstrate the method with reference to a side-sectional elevations of an assembly of two parts of an optical filter and the optical filter formed from this assembly.

Figure 1A:
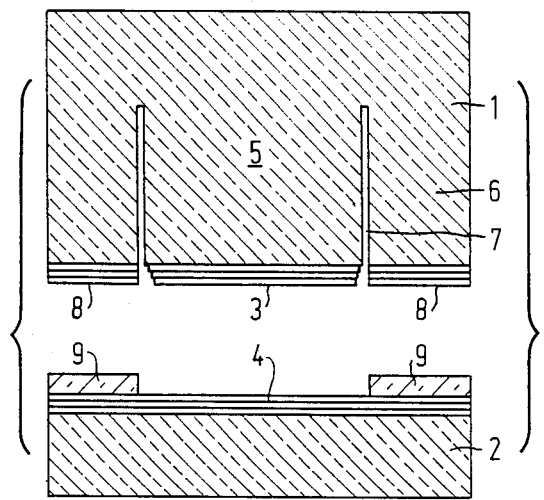
Figure 1B:
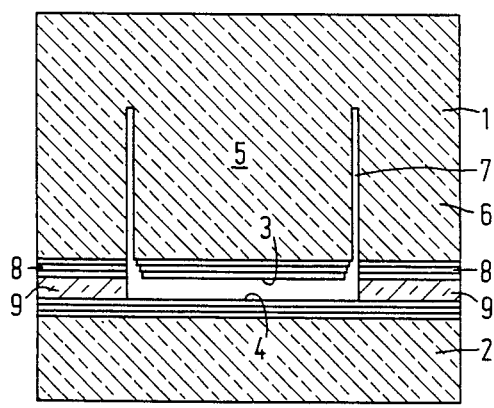

FIG. 1a is a cross-sectional view through the components of an optical filter. Dichroic layers consisting of mirrors 3 and 4 are vapour deposited on glass parts 1 and 2 and have a coefficient of reflection which is 99% or larger for a given wavelength range. The glass part 1 consists of a central part 5 and a coaxial part 6 which is separated from part 5 by a coaxial slot 7 so as to prevent deformation of the mirror 3. A stack of dichroic layers 8 which is as thick as the stack on part 5 is vapour deposited on part 6 as well as on part 5. A ring 9 of vapour deposited glass having a thickness of, for example, 0.5 μm is provided on the mirror 4 on part 2 for accurately adjusting the spacing between the mirrors 3 and 4. The ring 9 and the layers 8 are then activated for 1 minute by slightly polishing them with cerium oxide ($CeO_2$) and are then placed against each other (FIG. 1b) as a result of which the bond is obtained by wringing in contact. The reduction of the thickness of the layer as a result of the slight polishing treatment with cerium oxide is negligibly small. Said slight polishing treatment, however, is very effective for the wringability. As a matter of fact polishing serves for the (chemical) activation of the surfaces.

Figure 2:
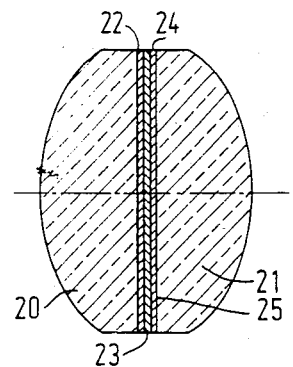
FIG. 2 is a cross-sectional view of a lens having an electro-optical layer which can be influenced.

FIG. 2 is a sectional view through a lens. Said lens comprises two lens halves 20 and 21 of glass. A 0.5 μm thick indium-tin oxide layer 22 is provided on lens half 20 and on said layer a 2 μm thick $BaTiO_3$ layer 23 is provided on which again a 0.5 μm thick indium-tin oxide layer 24 is provided. The latter layer is slightly polished with cerium oxide and the similarly slightly polished surface 25 of lens part 21 is then bonded to layer 24 by wringing in contact. By applying a suitable potential difference between the layers 22 and 24, layer 23 may be made to be polarizing. So far lenses and lens parts have been bonded together by means of glue (for example, lens bond type M62, a type indication of Summers Labs. Inc. Optical Division, Fort Washington, Pa. 190 34, USA). Bonding by means of wringing in contact is more lasting and the penetration of dirt into the bond is much less than in a glued joint.

Figure 3:
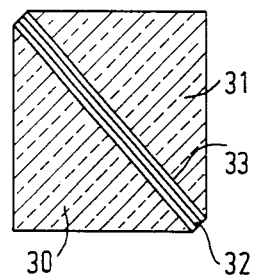
FIG. 3 is a cross-sectional view of a polarizing beam splitter.

FIG. 3 is a sectional view of a polarizing beam splitter which is used in glass-fibre communication systems and in so-called laser vision systems in which an optical information carrier is read by means of a laser beam. Said beam splitter consists of a first glass prism 30 and a second glass prism 31. The glass of the prism has a refractive index of 1.52 (n=1.52). Provided on prism 30 is a layer stack 32 consisting of 19 layers which is composed of alternately MgO (n=1.7) and $MgF_2$ (n=1.4) layers each having an optical thickness of τ/4. This system may also be represented as follows:

glass (HL)$^9$H glass wherein

H are the MgO layers and

L are the $MgF_2$ layers.

After slightly polishing the last H layer (MgO) and the surface 33 of the second prism, the second prism is bonded to the last H layer by wringing in contact.

It will be obvious that the method may also be used to bond together parts which consist of a material other than glass, for example, aluminum oxide, semiconductor materials, etc.

What is claimed is:

1. A method of bonding together a first part and a second part, at least one layer of a solid being provided between said parts, characterized in that the outermost of said layers of said solid provided on at least one of said parts is an indium-tin oxide layer and has a surface which is activated by being polished in an amount sufficient only to negligibly reduce its thickness, a surface of said other part is similarly activated and then the two similarly activated surfaces are placed one against the other without any additional treatment and are thereby bonded together by wringing in contact.

2. A method of claim 1 wherein at least one layer having a refractive index that differs from that of the materials of the parts is provided between said parts.

3. A method as claimed in claim 1, characterized in that at least one electro-optical layer is provided between two indium-tin oxide layers.

4. A method as claimed in claim 1, characterized in that at least one magneto-optical layer is provided between the parts.

5. A method as claimed in claim 1, characterized in that at least one electro-optical layer is provided between the parts.

6. A method of bonding together a first part and a second part, at least one layer of a solid being provided between said parts, characterized in that at least one layer of a non-metallic solid is provided on at least said first part, the outermost surface of the layer furthest from said first part, of all of said layers present on said first part, is activated by being polished in an amount sufficient only to negligibly reduce its thickness, an opposing surface of said second part or an opposing surface of a layer of a non-metallic solid, furthest removed from said second part, of all of said layers present on said second part, is similarly activated and then the two similarly activated surfaces are placed one against each other and wrung in contact without any additional treatment and are thereby bonded together.

7. A method as claimed in claim 6, characterized in that at least one layer is provided between the parts and has a refractive index which differs from the refractive index of the materials of the parts.

8. A method as claimed in claim 7, characterized in that at least one magneto-optical layer is provided between the parts.

9. A method as claimed in claim 7, characterized in that at least one electro-optical layer is provided between the parts.

10. A method as claimed in claim 6, characterized in that at least one magneto-optical layer is provided between the parts.

11. A method as claimed in claim 6, characterized in that at least one electro-optical layer is provided between the parts.

12. A method as claimed in claim 6, characterized in that cerium oxide ($CeO_2$) is used as a polishing medium in said polishing treatment.

13. A method of bonding together a first part and a second part, at least one layer of a solid being provided between said parts, characterized in that at least one layer of a solid is provided on at least said first part, the outermost surface of the layer furthest from said first part, of all of said layers present on said first part, is activated by being polished in an amount sufficient only to negligibly reduce its thickness, an opposing surface of said second part or an opposing surface of a layer of a solid, furthest removed from said second part, of all of said layers present on said second part, is similarly activated and then the two similarly activated surfaces are placed one against each other and wrung in contact without any additional treatment and are thereby bonded together.

* * * * *